US012558604B2

(12) United States Patent (10) Patent No.: US 12,558,604 B2
De Abreu Cardoso Batista Marques et al. (45) Date of Patent: Feb. 24, 2026

(54) ELECTRONIC SCORING SYSTEM FOR COMBAT SPORTS

(71) Applicant: Pedro Miguel De Abreu Cardoso Batista Marques, Parede (PT)

(72) Inventors: Pedro Miguel De Abreu Cardoso Batista Marques, Parede (PT); Nuno Pedro Caeiro Lopes Moreno, Venda Do Pinheiro (PT)

(73) Assignee: Pedro De Abreu Cardoso Batista Marques, Parede (PT)

( * ) Notice: Subject to any disclaimer, the term of this patent is extended or adjusted under 35 U.S.C. 154(b) by 281 days.

(21) Appl. No.: 18/276,496

(22) PCT Filed: Feb. 16, 2022

(86) PCT No.: PCT/IB2022/051377
§ 371 (c)(1),
(2) Date: Aug. 9, 2023

(87) PCT Pub. No.: WO2022/175836
PCT Pub. Date: Aug. 25, 2022

(65) Prior Publication Data
US 2024/0165483 A1 May 23, 2024

(30) Foreign Application Priority Data
Feb. 22, 2021 (PT) .......................................... 117078

(51) Int. Cl.
*A63B 71/06* (2006.01)
*G06F 16/174* (2019.01)

(52) U.S. Cl.
CPC .......... *A63B 71/06* (2013.01); *G06F 16/1744* (2019.01)

(58) Field of Classification Search
CPC ............................ G06F 16/1744; A63B 71/06
See application file for complete search history.

(56) References Cited

U.S. PATENT DOCUMENTS

2014/0164075 A1* 6/2014 Trujillo .................. G07C 13/00
705/12
2018/0326283 A1* 11/2018 Sexton .................... A63B 69/32
2018/0326823 A1 11/2018 Heidan
2020/0254324 A1 8/2020 Roufael
2021/0146242 A1* 5/2021 Nakamura .............. G06T 11/00
2022/0323847 A1* 10/2022 Lee ........................ H04N 21/81

* cited by examiner

*Primary Examiner* — Reginald A Renwick
(74) *Attorney, Agent, or Firm* — Rivka Friedman

(57) ABSTRACT
The present application describes an electronic scoring system, especially designed for combat sports. The system allows a judge to automatically and consistently record the scoring parameters throughout a combat and its various rounds. In order for this to be possible, the judge evaluation is captured periodically, during the combat, using a scoring device and is sent to, central control unit, which is in charge of all the processing underlying the determination of the final winner of the combat.

14 Claims, 4 Drawing Sheets

1

2

3

7

10

ELECTRONIC SCORING SYSTEM FOR COMBAT SPORTS

FIELD OF THE INVENTION

The present invention falls within the field of combat sports. In particular, the present invention relates to an electronic scoring system for combat sports.

BACKGROUND OF THE INVENTION

Combat sports are competitive contact sports where two competitors fight against each other. Examples of combat sports are Boxing, where different styles are included such as kickboxing, Judo, Tae Kwon Do, Jiu-Jitsu or Mixed Martial Arts (MMA).

The combat is divided into rounds and is carried out according to the contact rules defined for each modality. A judge is responsible for evaluating the performance of the two competitors and awarding the victory to the one with more points throughout the combat rounds. The final score reflects the sum of intermediate evaluations to the performance of each competitor during the progression of the combat, the record of which is currently being made with resource to analogical devices such as manual counters, or in a more archaic manner, by registering the scores in a notebook or simply relying on the judge's memory skills.

Furthermore, in many modalities, the combats are judged by more than one judge. This requires a final synchronisation between the records made by each one of them throughout, the combat, in order to reach a decision on the winner.

The current solutions do not offer any coherent method and/or consistency in the evaluation of the combats, and the awarding and transmission of the results depends on the completion of forms and a physical survey in paper format by each of the judges. There is therefore no automatic and reliable way to collect this data, and these evaluations are often difficult to justify as they are based on each judge's memory. In addition to this, the whole process of consolidating the evaluations of each judge is a slow and unreliable process subject to human error on the part of the central desk.

The present invention intends to solve the problems identified in the state of the art, by developing an automatic and coherent way to make a record of the judge's evaluations throughout a combat. Furthermore, a management and record-keeping platform is also proposed, which will be aimed at storing, in a systematic way, past evaluations made by each judge, thus allowing them to be available for consultation.

SUMMARY OF THE INVENTION

The present invention relates to an electronic scoring system for combat sports, which provides automation in collecting the scores awarded by each judge during a combat. In addition, it favours consistency in the awarding of scores throughout the combat, as it allows real time consultation of the scores record.

The proposed system is intended to create consistency in the scoring done by judges, regardless of their training, as all judges will now use, specific device for this purpose, which imposes parameters and metrics that are the same for all of them.

To this end, the electronic scoring system for combat sports developed is comprised of:

at least one scoring device adapted in order to record the scoring parameters of a combat. Said device comprises an input module which is adapted so that the input parameters are entered; a processing module programmed to convert at least one input parameter into a scoring parameter, and a communication module adapted to provide a connection to a central control unit.

a central control unit adapted to monitor the scoring parameters of at least one combat, comprising a processing module and a communication module adapted to provide connection to at least one scoring device.

More particularly, the proposed system is characterized in that the scoring devices are configured to transmit to the central control unit at least one scoring parameter; and in that the processing module of the central control unit is programmed to process at least one scoring parameter and determine a final score of at least one combat.

In an embodiment of the invention, the developed system comprises a plurality of central control units, each one having a group of scoring devices associated with it.

DETAILED DESCRIPTION OF T INVENTION

Figure 1:
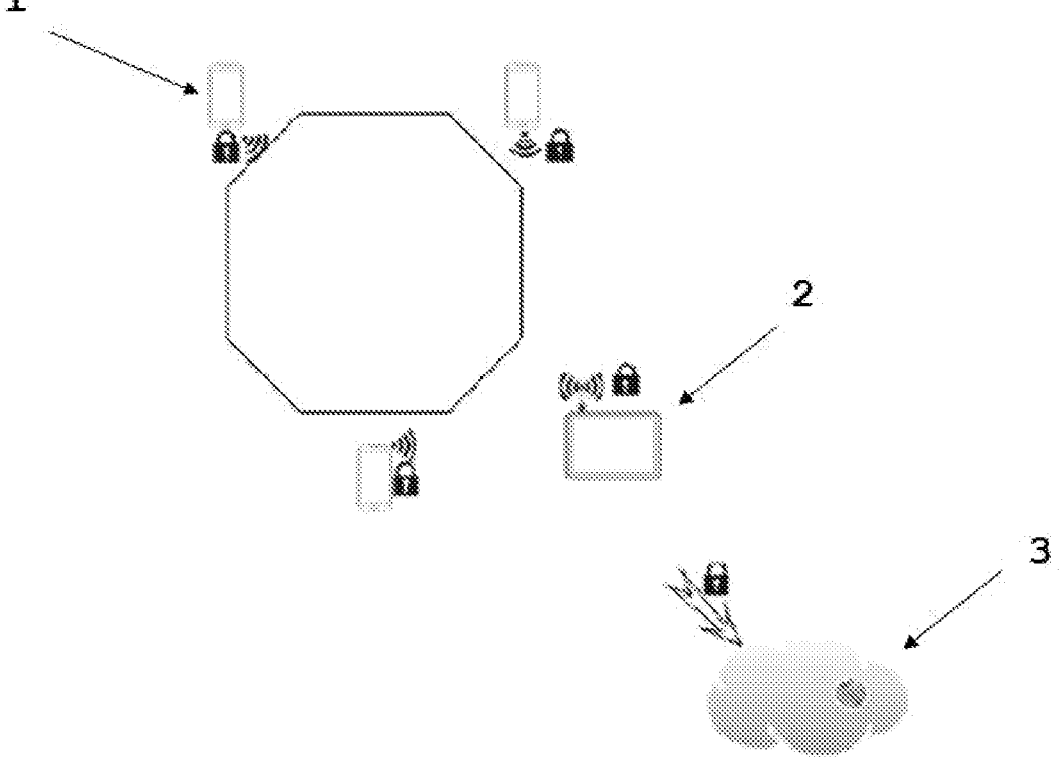
FIG. 1—Schematic representation of an embodiment of the developed electronic scoring system for combat sports, in which the reference signs mean:
  1—scoring device;
  2—central control unit;
  3—information management platform.
Figure 2:
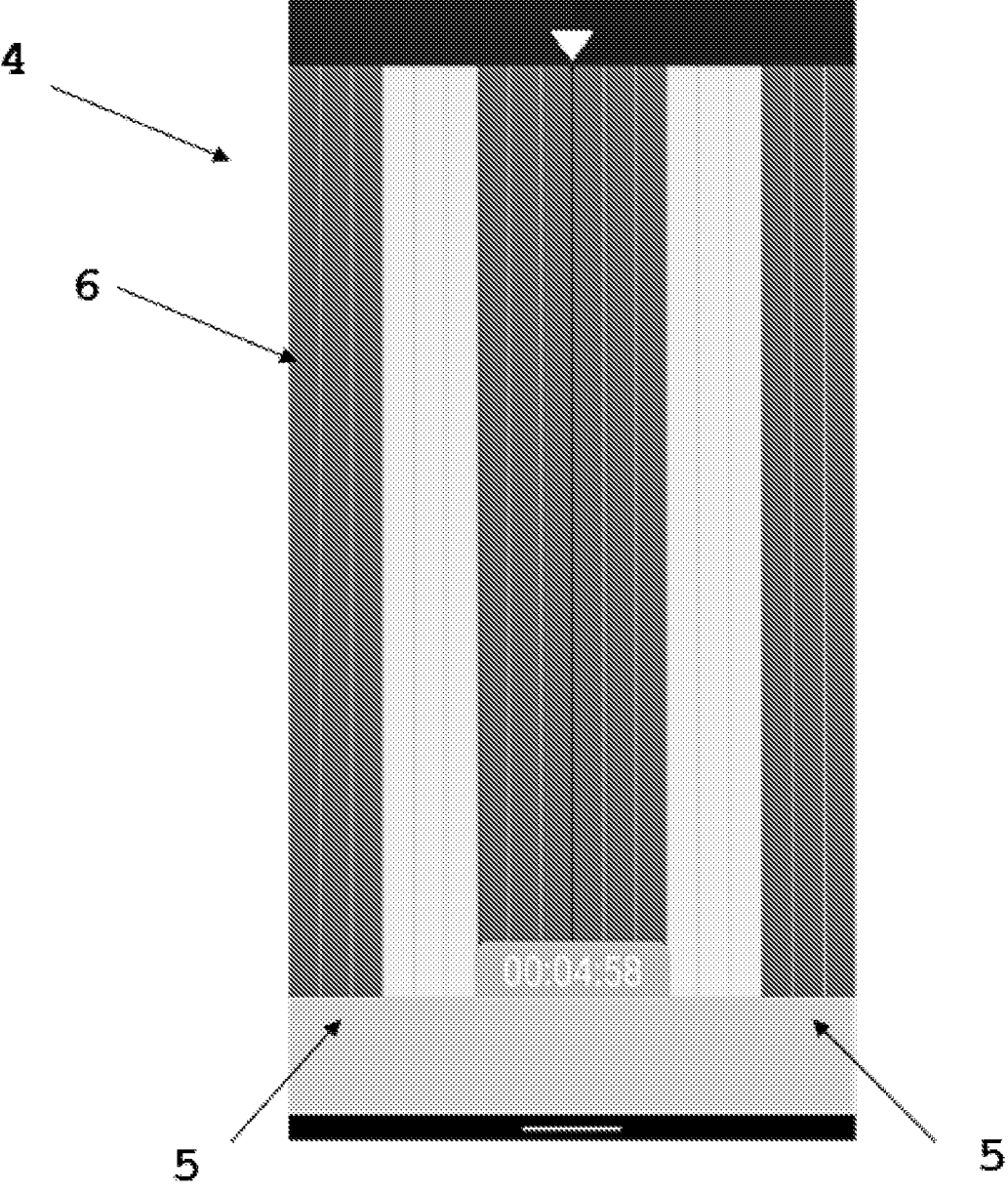
FIG. 2—representation of an evaluation graphical interface, provided by the developed system for evaluating a round of combat, where the reference signs mean:
  4—evaluation graphical interface;
  5—symmetrical halves referring to each competitor;
  6—evaluation levels.
Figure 3:
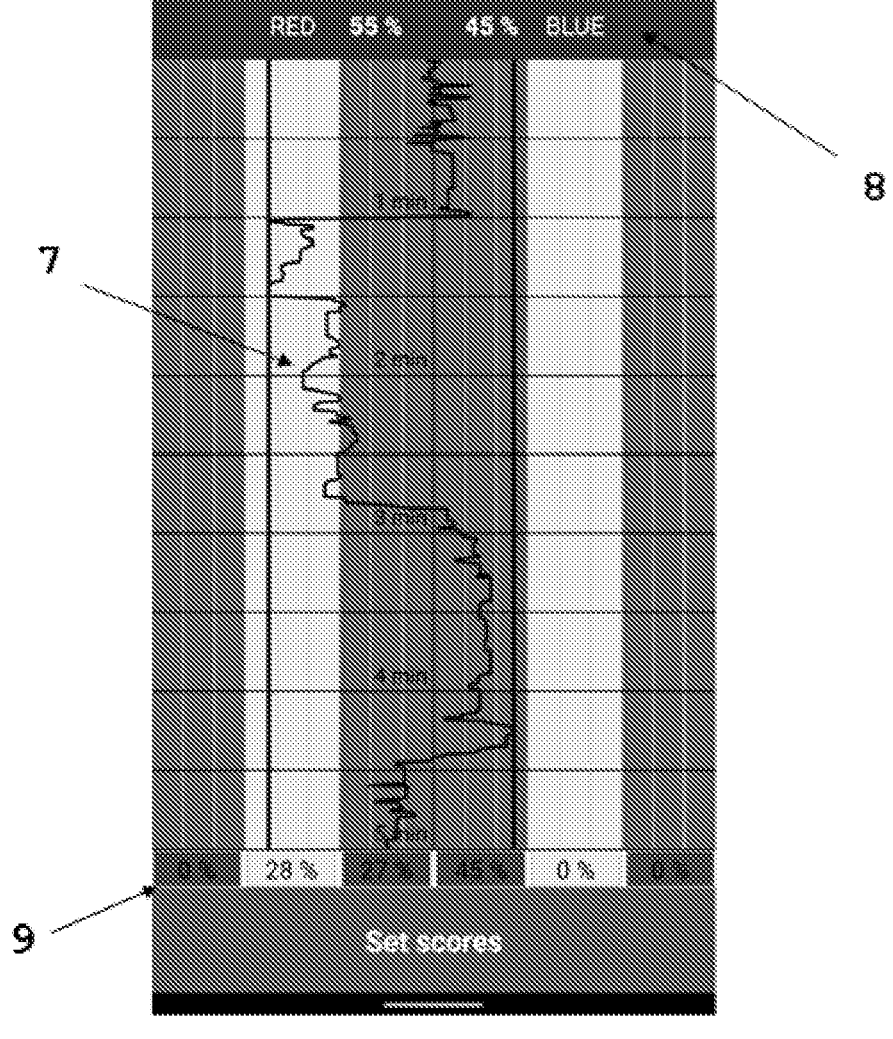
FIG. 3—representation of an evaluation graphical interface, provided by the developed system for evaluating a round of combat, where the reference signs mean:
  7—scoring parameter throughout the round;
  8—percentage distribution of the score given by the judge.
  9—percentage distribution of the score given by the judge of each competitor for each evaluation level.
Figure 4:
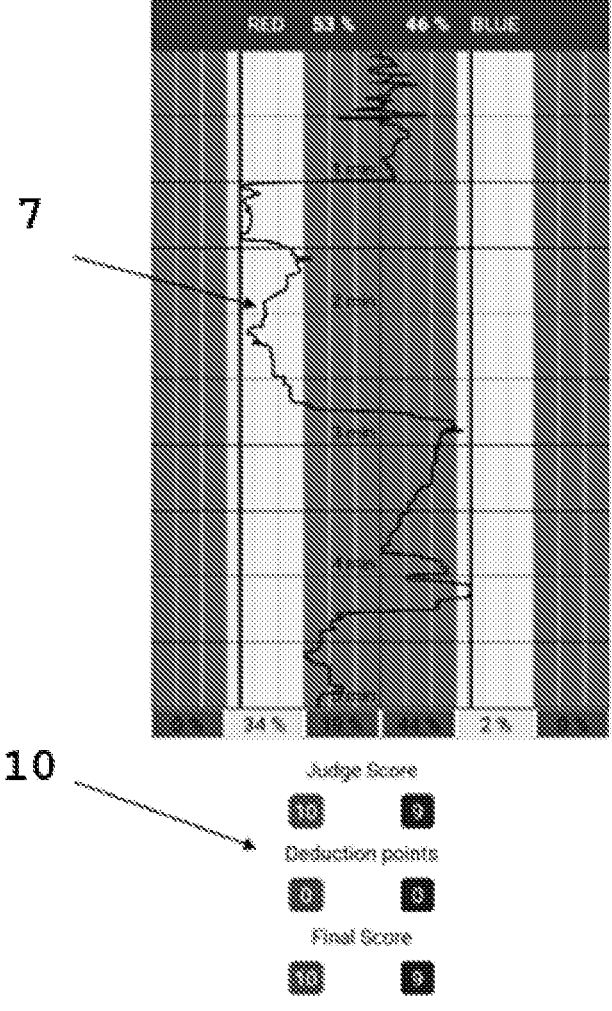
FIG. 4—representation of an evaluation graphical interface, provided by the developed system for evaluating a round of combat, where the reference signs mean:
  7—scoring parameter throughout the round;
  10—final score of the round.

The most general advantageous configurations of the present invention are described in the Summary of the Invention. These configurations are detailed below, according to other advantageous and/or preferred embodiments of the present invention.

The invention aims to provide a system enabling a judge to perform an automatic and consistent recording of the scoring parameters throughout a combat and its various rounds. For this to be possible, the judge's evaluation is captured periodically during the combat with the aid of a scoring device and is sent to the central control unit, which is charge of all the processing underlying the determination of the final winner.

In a preferred configuration of the present invention, the system comprises two or more scoring devices. In this particular aspect, the proposed system is also operational for combat modalities that require the presence of more than one judge.

In another preferred configuration, each scoring device has a unique identification code by which the devices identify themselves to the central control unit. In fact, and according to an alternative embodiment of the invention, the processing module of the central control unit is configured to associate scoring devices bj y means of their respective identification codes according to a combat. In this way, the central control unit is enabled to monitor a plurality of combats, whether or not occurring simultaneously, being configured to calculate the final score of each combat according to the scoring parameters registered by the respective scoring devices associated therewith. Alternatively, the system may comprise plurality of central control units, each of which monitors a combat or a set of combats that may be occurring simultaneously in different geographic locations.

In this scope, in a preferred embodiment of the system, the latter is implemented through wireless communication networks, all elements of the system being connected to each other by wireless communication protocols.

In another preferred configuration, processing module of the central control unit is configured to enable and disable the operation of a scoring device. Thereby, the central control unit executes a certification protocol for scoring devices (and their judges), allowing only authorised devices to transmit scoring parameters. Therefore, unauthorised devices will not influence the determination of the final score of a given combat by the central control unit.

In another preferred configuration, the communication between at least one scoring device and the central control unit, for transmission of scoring Parameters, is encrypted by means of composite key algorithms using encryption methods, such as for example RSA. In this context, the processing module of a scoring device is additionally programmed to generate a .MAP file extension for compression of at least one scoring parameter. Said file comprises a plurality of fields of variable size, each field being separated by at least one predefined special character. This aspect is particularly important in fights that are judged by more than one judge, for example by three judges as is the case of an MMA fight, and that therefore require a correct synchronism between scoring devices and central control unit.

In another preferred configuration, the input module of a scoring device comprises a touchscreen. Particularly, the input module of a scoring device is additionally configured to implement an evaluation graphical interface. Said evaluation graphical interface is designed to display a scoring graphical environment, which is divided into two symmetrical halves, each half representing competitor. To this end, said scoring graphical environment comprises two measurement axes:

the level of impact of one competitor on the other; and the duration of the combat.

Additionally, each symmetrical half of the scoring graphical environment may comprise a plurality of evaluation levels, so as to provide greater detail when entering the input parameter that will subsequently be converted into a scoring parameter. In this particular case, the input parameter corresponds to a coordinate of the scoring graphical environment, the processing module of the scoring device being configured to convert a coordinate of the scoring graphical environment into an evaluation parameter.

In an alternative embodiment of the present invention, the system comprises an information management platform provided via a communications network system. Said platform is operatively connected to a central control unit and comprises a score database, wherein the central control unit stores the scoring parameters and the final scores of a combat. In the case of the system comprising a plurality of central control units, each of them is connected to the information management platform. In this way, the scores referring to a combat are stored in a structured manner according, for instance, to the judge who awarded them. Additionally, the system includes an artificial intelligence module, such as machine learning, configured to execute predictive methods for the analysis of scores stored in the database of scores. For such information to be available, the platform further comprises a user interface, adapted to provide access to the scores database and to the artificial intelligence module.

In an alternative embodiment, the system additionally comprises a combat simulation module. This module includes processing means adapted to emulate a virtual combat and is configured to receive scoring parameters related to the virtual combat, which are issued through the user interface. The platform thus allows the training of judges, and the scores collected in the virtual environment can also be used by the artificial intelligence module to provide judges with feedback on their training.

Finally, in an alternative embodiment of the system, the scoring device is a mobile process-ng device, preferably a smartphone.

EMBODIMENTS

In a particular embodiment of the developed system, the scoring device is smartphone comprising a touchscreen-type input module, in which the configuration of a graphical interface allows input parameters to be registered, referring to the judge's evaluations, according to the respective competitor. The graphical interface made available from the judge's smartphone touchscreen is configured to display a vertical graph divided in two symmetrical halves, representing each of the competitors, and in which said halves are divided into a plurality of columns representing the judge's evaluation level in relation to each competitor. Namely, the graphical representation includes two measurement axes, the X axis that measures the level of Impact of each competitor on the opponent and the vertical axis (Y) that measures the time elapsed during one round of the combat. In this context, the judge enters his evaluation with his finger on the touchscreen of the smartphone, thereby recording in continuous manner the coordinates of his evaluation. This allows a graph to be created of each round of the combat, during its progression, providing the judge with an immediate and objective display of the scores awarded.

These data are transmitted to the central control unit in a .MAP extension file which has a specially developed format, each field of variable size being separated by one or more special predefined characters. This ensures that the data structure is always the same, minimising the margin of error, and that the transmitted data is properly encrypted in a format recognised only by the system elements. For this purpose, the scoring parameters transmitted by the judges' smartphones are encrypted by composite key using RSA encryption. This process ensures that the central control unit is only authorised to receive information from duly identified smartphones. This encryption key changes from combat to combat.

The data shared and properly formatted with the respective X and Y coordinates and the score given by the judges allow the central control unit to evaluate the respective combat exhibiting the results of each judge and knowing in real time who was the winner of the combat.

The start, pauses and end of each combat are defined and indicated by the central control unit, so there is a need for the smartphones of each of the judges to be properly synchronised and have a real-time connection to it. In other words, the smartphones will only start their evaluation when the central unit gives that indication.

The connection between smartphones and the central control unit can be made using various wireless communication protocols, either Wi-Fi, NSD—network service discovery (Android) and/or Bonjour (iOS) or Bluetooth.

The system also includes an information management platform, where not only all the information captured by the smartphones will stored, but also historical information of all the combats, rounds, judges, athletes, federations, among others, these being stored and accessible through a user interface. In particular, it is possible to configure the platform so that it sends asynchronous notifications to real-time web applications.

As will be evident to a person skilled in the art, the present invention should not be limited to the embodiments described herein, with a number of changes being possible, which remain within the scope of this invention.

Of course, the preferred embodiments above described are combinable in the different possible forms, the repetition of all such combinations being herein avoided.

The invention claimed is:

1. An electronic scoring system for combat sports comprising:

at least one scoring device adapted to record scoring parameters of a combat, comprising an input module adapted so that input parameters are entered; a processing module programmed to convert at least one input parameter into a scoring parameter, and a communication module adapted to provide a connection to a central control unit;

a central control unit adapted to monitor scoring parameters of at least one combat, comprising a processing module and a communication module adapted to provide connection to at least one scoring device;

wherein at least one scoring device being configured to transmit to the central control unit at least one scoring parameter;

wherein the processing module of the central control unit is programmed to process at least one scoring parameter and calculate a final score from at least one combat, and wherein the processing module of the central control unit is configured to associate scoring devices by their respective identification codes according to a combat; and the central control unit being adapted to monitor a plurality of combats, and configured to calculate the final score of each combat according to the scoring parameters recorded by the respective scoring devices associated therewith; and wherein the system comprises a plurality of central control units.

2. The electronic scoring system according to claim 1, wherein the electronic scoring system comprises two or more scoring devices.

3. The electronic scoring system according to claim 1, wherein each scoring device has a unique identification code.

4. The electronic scoring system according to claim 1, wherein the processing module of a central control unit is configured to enable and disable operation of a scoring device.

5. The electronic scoring system according to claim 1, wherein a scoring device is configured to transmit a scoring parameter periodically to a central control unit.

6. The electronic scoring system according to claim 1, wherein the communication between the at least one scoring device and a central control unit for transmitting scoring parameters is encrypted with composite key algorithms using encryption methods that are preferably of the RSA type;

and wherein, the processing module of a scoring device is additionally programmed to generate a .MAP file extension for compression of at least one scoring parameter; said file being composed of a plurality of fields of variable size, each field being separated by at least one predefined special character.

7. The electronic scoring system according to claim 1, wherein the input module of a scoring device comprises a touchscreen;

and wherein, the input module of a scoring device is additionally configured to implement a graphical evaluation interface; said graphical evaluation interface being designed to display a graphical scoring environment divided into two symmetrical halves, each half representing a competitor; said graphical scoring environment comprising two measurement axes:

the level of impact of one competitor on the other; and the duration of the combat.

8. The electronic scoring system according to claim 7, wherein each symmetrical half of said graphical scoring environment comprises a plurality of evaluation levels.

9. The electronic scoring system according to claim 8, wherein the input parameter corresponding to a coordinate of the graphical scoring environment, and in that, the processing module of the scoring device being configured to convert a coordinate of the scoring graphical environment into an evaluation parameter.

10. The electronic scoring system according to claim 1, wherein the electronic scoring system additionally comprises an information management platform, provided through a communication network system;

said information management platform being operatively connected to a central control unit; and wherein the information management platform comprises a score database; and a central control unit being adapted to store scoring parameters and final scores of a combat in the score database.

11. The electronic scoring system according to claim 10, wherein the electronic scoring system additionally comprises an artificial intelligence module, wherein the artificial intelligence module is configured to execute predictive methods for analysis of scores stored in the score database.

12. The electronic scoring system according to claim 11, wherein the information management platform additionally comprises a user interface, adapted to provide access to the score database and to the artificial intelligence module.

13. The electronic scoring system according to claim 12, wherein the electronic scoring system additionally comprises a combat simulation module; said simulation module comprising processing means adapted to emulate a virtual combat, and being configured to receive scoring parameters relating to the virtual combat, issued via the user interface.

14. The electronic scoring system according to claim 1, wherein the scoring device is a mobile processing device, preferably a smartphone.

\* \* \* \* \*